Nov. 8, 1927.

A. K. BRUMBAUGH 1,648,536

ELECTRIC VEHICLE

Filed July 23, 1925

INVENTOR
Andrew K. Brumbaugh
BY
ATTORNEY

Nov. 8, 1927.
A. K. BRUMBAUGH
1,648,536
ELECTRIC VEHICLE
Filed July 23, 1925
2 Sheets-Sheet 2
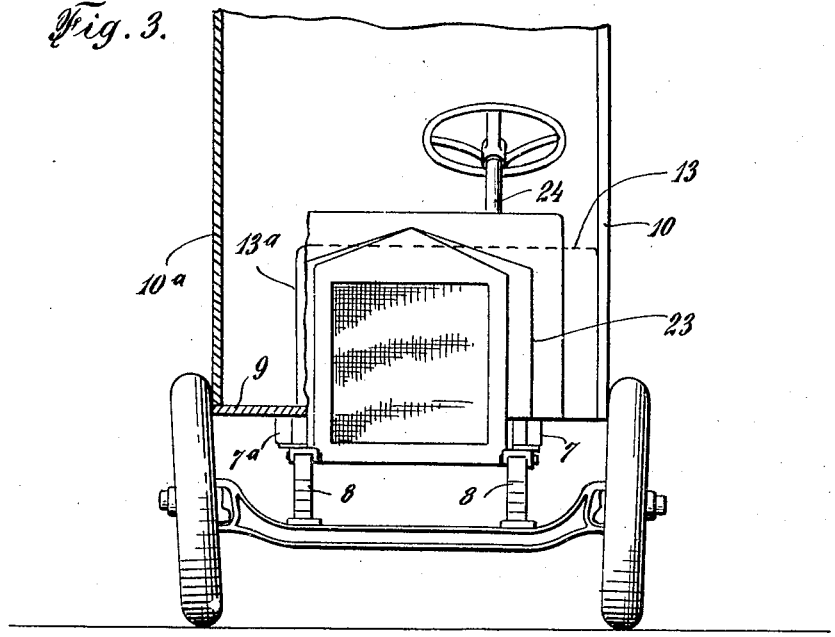
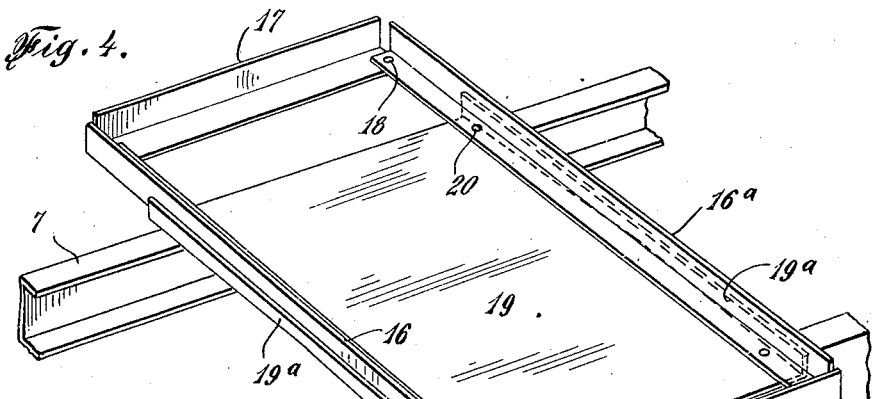
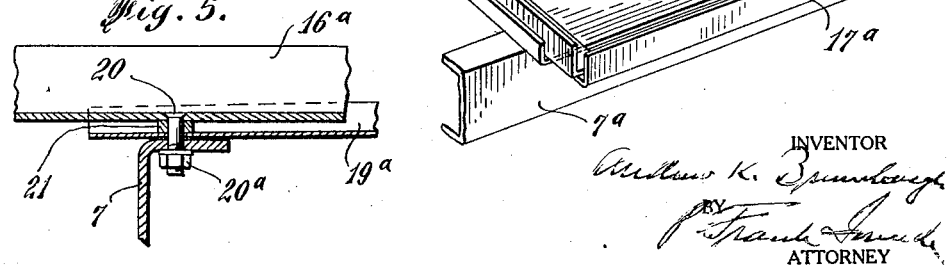
INVENTOR
ATTORNEY Patented Nov. 8, 1927.

1,648,536

UNITED STATES PATENT OFFICE.

ANDREW K. BRUMBAUGH, OF ARDMORE, PENNSYLVANIA, ASSIGNOR TO THE AUTO-CAR COMPANY, OF ARDMORE, PENNSYLVANIA, A CORPORATION OF PENNSYLVANIA.

ELECTRIC VEHICLE.

Application filed July 23, 1925. Serial No. 45,486.

The present invention relates generally to motor vehicles and is more especially directed to improvements in the structure of electrically driven vehicles of the type in which the storage batteries are mounted or carried within the body and upon the deck thereof.

As is well known, in many of those vehicles in which the batteries are carried on the deck or floor of the body, it has been the practice to locate them within a compartment beneath the driver's seat, such compartment extending transversely of the body and from side to side thereof, the ends of the battery being almost directly over the longitudinal frame members of the chassis so that the load is equally distributed on the front springs of the vehicle.

This method of housing the battery is advantageous in many ways, but in various classes of vehicles which are designed for operation in certain commercial fields, it has been found to be more or less unsatisfactory, because of the almost complete isolation of the front part or driver's cab from the remainder of the body by the battery compartment, which makes it impossible for the operator or driver of the vehicle to enter the load space except from the rear. This, it has been found, is a material factor in delaying deliveries and increasing operating costs, as each time a stop is made for a delivery of merchandise, it is necessary for the driver to dismount and pass to the rear end of the vehicle in order to enter the load space, which obviously entails a loss of time. Assuming that a vehicle makes frequent delivery stops in a day's run, it will be seen that, in the aggregate, this loss will become appreciable. Furthermore, with the transverse battery compartment as now arranged, the loading of the body must be carefully handled so that the merchandise first to be delivered may be stored or packed near the tail end thereof.

Some attempts have been made to solve the problem by arranging the battery cells in compartments placed along the sides of the body, leaving a central passageway, but the useful load space is so greatly curtailed by this method that it has been found to be uneconomical in practical commercial use.

The general object of the present invention is to provide a method of carrying and housing the battery on the deck of a vehicle body so that all of the advantages flowing therefrom may be retained, while the disadvantages which are inherent to existing methods may be eliminated in a simple and economical manner.

More specifically, it is the purpose of my invention to provide a passageway from the front part or driver's cab of a vehicle to the rear or load space of the body in those types of vehicles wherein it is found necessary or desirable to employ a battery compartment located beneath the driver's seat, so that the driver or operator may enter the load space from the front end of the body without dismounting from the vehicle.

It is also an object of my invention to provide a method of supporting a storage battery beneath the driver's seat of an electric vehicle in a position offset from the longitudinal centre line of the vehicle in a manner in which the normal lateral balance of the vehicle will be preserved, irrespective of the location of said battery.

My invention further comprehends the provision of a supporting frame or tray for the aforesaid battery, having a drip pan associated therewith.

Other objects and advantages of my invention will present themselves as the description proceeds, and I would have it clearly understood that I reserve unto myself all rights to the full range of equivalents, both in structure and in use, to which I may be entitled under my invention in its broadest aspect.

For the purposes of the present disclosure, I have elected to illustrate and describe one embodiment of my invention. My invention may take other forms, however, without departing from the spirit and scope thereof, as defined by the appended claims.

In the drawings:

Figure 3 is a front elevation of the structure shown in Figure 1.

Figure 4 is a view in perspective of the battery tray and associated drip pan, and Figure 5 is a sectional detail of the structure shown in Figure 4.

Figure 1:
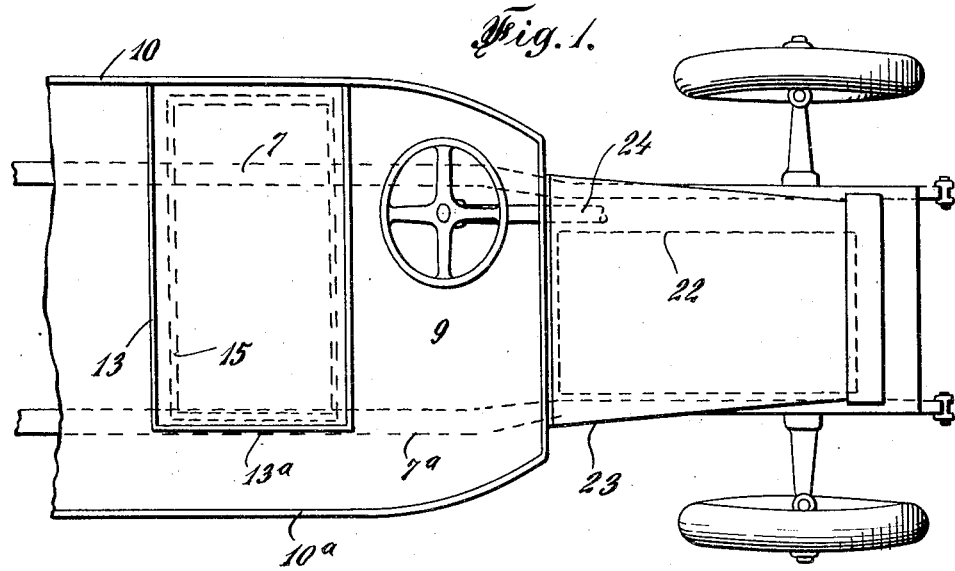
Figure 1 is a top plan view of the forward part of an electric motor vehicle, embodying my invention.

Referring now to the drawings in detail, in which like characters of reference are employed to designate similar parts in the several views, 7 and 7ª indicate the usual longitudinal frame members of the chassis, the latter being suspended from the axles by the customary laminated springs, the front ones only of which are shown at 8.

The body, which, as herein shown, is of the box or delivery type, consists of the deck or floor 9 and side walls 10 and 10ª. A top, not shown, may or may not form a part of the structure and the rear or tail end may be closed, if desired, by doors, the usual tailboard, or in any other suitable manner.

Usually the body extends to the dashboard 11, but the sides thereof may terminate at the driver's seat, the portion forward thereof being open and provided with removable floor boards to afford access to the mechanism of the chassis.

Figure 2:
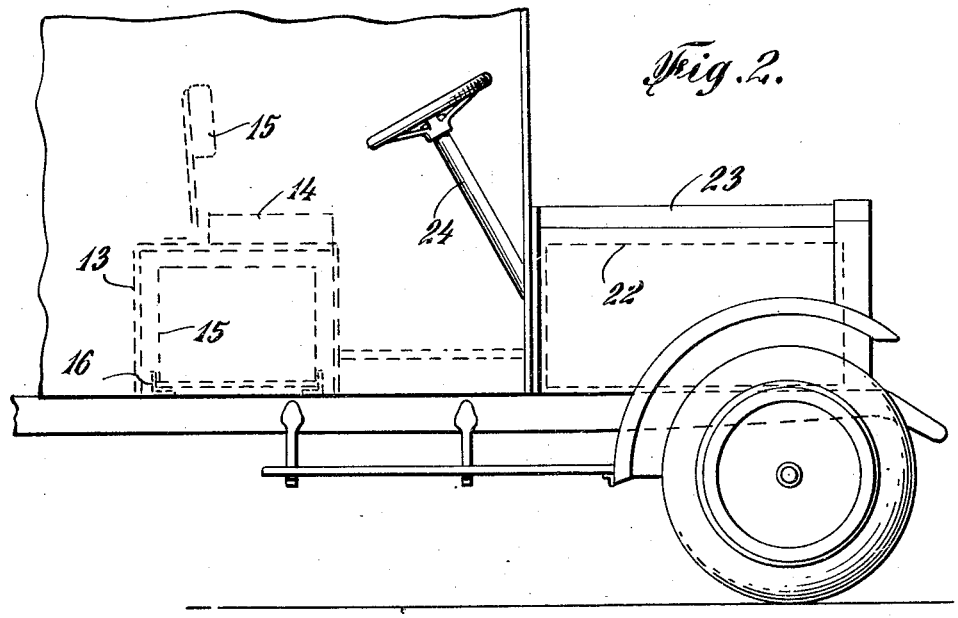
Figure 2 is a side elevation of the structure shown in Figure 1.

As is customary in wagon and truck construction, the body is of a greater width than the chassis frame so that when it is bolted or otherwise fixed in position thereon the floor or deck 9 will extend outwardly of, or overhang, the longitudinal frame members 7 and 7ª, as clearly shown in Figures 1 and 2.

Located within the forward end of the body, is a compartment 13 which forms a support for the driver's seat 14, a backrest 15 being preferably hinged to the top of the compartment. This compartment, which is oblong in shape, extends transversely of the body, from the left hand side wall 10 thereof, to a point about directly over or above the right hand frame member 7ª of the chassis, the space between the end 13ª of the compartment and the adjacent side wall 10ª of the body forming an aisle or passageway through which the operator or driver of the vehicle may enter the portion of the body to the rear of the compartment, without dismounting from the vehicle as is necessary in present structures in which the battery compartment extends from wall to wall of the body.

Positioned within the compartment 13 and supported upon the chassis frame members 7 and 7ª is a rectangular frame composed of the long and short angle irons 16, 16ª, 17 and 17ª, bolted together at their meeting ends, as shown at 18. Disposed beneath the aforesaid frame, which forms a tray or support for the storage battery 15, is a drip-pan 19, preferably of sheet metal, having flanges 19ª struck up along its side edges, the flanges extending transversely of the vehicle frame. The portions on each side of the fore and aft median line of said drip-pan, it will be noted, have a gradual downward slope or inclination toward their respective ends, which project slightly beyond or overhang the contiguous frame members 7 and 7ª. (See Figure 4.) The battery frame or tray and the drip-pan 19 are immovably secured to the respective chassis frame members 7 and 7ª, by the bolts 20 seated in suitable apertures in the frame members 16 and 16ª of the tray and passing through openings in the drip-pan, adjacent to the flanges thereof, and the top flanges of the chassis members. Due to the inclination of the respective halves of the drip-pan, suitable spacers 21, which may be washers or the like, are inserted between the bottom flanges of the tray members 16 and 16ª and the surface of the drip-pan, to preserve the proper clearance therebetween when the securing nuts 20ª are turned up on the shanks of their respective bolts to lock the aforesaid elements in cooperative relation.

The spacing of the tray members from the drip-pan, as described, combined with the inclined surfaces of the latter will insure complete drainage of the drip-pan over the ends thereof, it being obvious that the extension of the drip pan ends beyond the supporting chassis frame members 7 and 7ª as described, will protect the latter from injurious acid deposits, as the drippings fall to the street or roadway.

As will be observed, the battery tray, like the compartment 13, within which it is housed, is offset to the left of the fore and aft centre line of the vehicle, the member 17ª abutting upon the left hand wall of the compartment 13 which is preferably detachable so that the battery may be removed from the tray. This may be accomplished by lifting the battery out of the tray or by sliding it outwardly along the ways formed by the tray members 16 and 16ª when either of the end or retaining members 17 and 17ª has been disconnected therefrom by the removal of the proper bolts 18.

When the battery is located within its tray, it will be apparent that the load will be unequally distributed upon the vehicle springs, which ordinarily might be found to be objectionable. However, in the present invention, the eccentric load of the battery 15 is compensated for or counterbalanced by the battery 22 housed beneath the hood 23 at the forward end of the chassis being located to the right of the longitudinal median line of the vehicle. By this means, the normal equilibrium of the suspended load of the vehicle is maintained and the steering mechanism, generally indicated at 24, is free from any possible interference which might result from the placing of the forward battery 22 in the usual position.

While I have described my invention with reference to the particular structure shown, it is manifest that the general objects which are set out, may be attained by such modifications as may be found necessary to meet practical requirements, all of which come within the scope of the present disclosure.

I claim:

1. An electric vehicle having laterally spaced longitudinal frame members and a deck mounted thereon, each of the sides thereof being located outwardly of the adjacent longitudinal frame member, a compartment located transversely of said deck and extending from one side thereof to a line spaced inwardly of the opposite side of said deck to provide a passageway between the end of said compartment and the adjacent side of the deck, said compartment forming a support for a driver's seat, and means for supporting a battery within said compartment, whereby the center of weight of the battery will be eccentric of the longitudinal median line of the vehicle.

2. A vehicle having spaced longitudinal frame members and connecting transverse members, a body, having upwardly extending sides, mounted thereon, said sides being located in planes outwardly of and parallel to the vertical planes of the longitudinal frame members, a compartment separating the load space of said body from the driver's cab, said compartment being adapted to support a driver's seat and extending across the body from one side thereof to a line spaced from the other side thereof to provide an unobstructed passageway connecting the load space of the body and the driver's cab, and means for supporting a storage battery within said compartment and eccentric of the median fore and aft line of the vehicle.

3. An electric vehicle having a storage battery located transversely of the forward end of the body and to the rear of the front axle thereof, said battery being offset from the longitudinal median line of the vehicle, and a second storage battery supported above the front axle of the vehicle and offset from the fore and aft centre line thereof to counterbalance the eccentric load of the first-mentioned battery.

4. An electric vehicle having a storage battery located transversely of the forward end of the body and on the deck thereof, said battery being positioned to the rear of the front axle of the vehicle with its transverse axis eccentric to the longitudinal median line of the vehicle, and a second storage battery mounted above the front axle of the vehicle and offset from the said median line thereof to counterbalance the eccentric weight of said first-mentioned battery.

5. In combination with the frame members of an electric vehicle, a storage battery tray formed of angle iron, said tray being adapted to be positioned transversely of said frame members and fixed thereto, and a drip-pan disposed beneath said tray and spaced therefrom, said drip-pan being directly supported by the upper flange of said frame members.

6. The combination with the longitudinal frame members of an electric vehicle of a storage battery tray composed of sections of angle iron, said tray being adapted to be supported transversely of said frame members, whereby the ends of the tray will extend outwardly of the frame members, the extension on one side being greater than that on the other, a drip-pan disposed beneath said tray formed to drain toward each side of the vehicle and beyond the aforesaid frame members, and means common to said tray and said drip-pan for fastening said elements to said frame members.

7. An electric vehicle having an enclosed body and spaced longitudinal and transverse frame members for supporting said body, a compartment located transversely of said body adjacent the forward end thereof and separating the load space of said body from the driver's cab, one end of said compartment being flush with one side of the vehicle body, the other end thereof being spaced from the opposite side of the vehicle body to form an aisle connecting the load space with the driver's cab, a storage battery tray contained within said compartment, the fore and aft center line of said tray being offset from the longitudinal center line of the vehicle body whereby the center of weight of a storage battery positioned in said tray will be eccentric of the aforesaid longitudinal center line of said vehicle body, and a drip pan formed to drain outwardly of each side of the vehicle associated with said tray.

8. A drip pan adapted to be associated with a storage battery of an electric vehicle to drain toward each side of the vehicle, said drip pan being formed of sheet metal and embodying a body-portion with upstanding flanges along two of its parallel edges, the ends of said drip pan being open and the surface of said body-portion sloping from a line bisecting said flanges toward each open end, and means for supporting said drip pan with its flanges disposed transversely of the longitudinal frame members of the vehicle.

ANDREW K. BRUMBAUGH.